US008821240B2

(12) United States Patent
Hornik et al.

(10) Patent No.: US 8,821,240 B2
(45) Date of Patent: Sep. 2, 2014

(54) WAGERING GAME WITH COLLECTION OF OBJECTS TO INFLUENCE GAME OUTCOME

(75) Inventors: Jeremy M. Hornik, Chicago, IL (US); Matthew J. Ward, Northbrook, IL (US); Peter W. Flemming, Oak Park, IL (US); Michael P. Casey, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 2884 days.

(21) Appl. No.: 11/280,826

(22) Filed: Nov. 15, 2005

(65) Prior Publication Data

US 2006/0111170 A1 May 25, 2006

Related U.S. Application Data

(60) Provisional application No. 60/628,417, filed on Nov. 16, 2004.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.

USPC ............................................ 463/13; 273/269

(58) Field of Classification Search

USPC ..................... 463/13, 17, 20, 18, 19; 273/269

See application file for complete search history.

(56) References Cited

U.S. PATENT DOCUMENTS

| | | | | |
|---|---|---|---|---|
| 5,326,104 | A * | 7/1994 | Pease et al. | 463/18 |
| 5,393,057 | A | 2/1995 | Marnell, II | |
| 5,401,024 | A * | 3/1995 | Simunek | 463/18 |
| 5,580,309 | A | 12/1996 | Piechowiak et al. | |
| 5,830,063 | A | 11/1998 | Byrne | |
| 5,975,528 | A | 11/1999 | Halaby | |
| 6,039,648 | A | 3/2000 | Guinn et al. | |
| 6,068,553 | A | 5/2000 | Parker | |
| 6,077,162 | A | 6/2000 | Weiss | |
| 6,142,872 | A * | 11/2000 | Walker et al. | 463/16 |
| 6,206,782 | B1 | 3/2001 | Walker et al. | |
| 6,312,232 | B1 | 11/2001 | Mori et al. | |
| 6,315,660 | B1 * | 11/2001 | DeMar et al. | 463/16 |
| 6,375,567 | B1 | 4/2002 | Acres | |
| 6,375,568 | B1 | 4/2002 | Roffman et al. | |
| 6,416,408 | B2 | 7/2002 | Tracy et al. | |
| 6,422,940 | B1 | 7/2002 | Walker et al. | |
| 6,609,973 | B1 | 8/2003 | Weiss | |
| 6,648,753 | B1 | 11/2003 | Tracy et al. | |

(Continued)

OTHER PUBLICATIONS

Senari.com, "Social Studies," http://senari.com/geography.html, Created Apr. 11, 2003. Accessed Jun. 17, 2009.*

*Primary Examiner* — Omkar Deodhar
*Assistant Examiner* — Reginald Renwick
(74) *Attorney, Agent, or Firm* — Nixon Peabody LLP

(57) ABSTRACT

A wagering game system is provided and includes a plurality of gaming terminals, each gaming terminal communicating with a gaming control system configured to conduct a basic wagering game and a group game. The gaming control system is configured to assign at least a portion an award or a wager associated with a gaming terminal to the group game. In the group game, each player's assignment is applied to perform a collecting or building of an object or objects in the group game. Upon satisfaction of a predetermined realization event in the basic wagering game or the group game, an award is awarded for a selected group of objects in the group game at a time of the predetermined realization event.

19 Claims, 9 Drawing Sheets

(56) References Cited

U.S. PATENT DOCUMENTS

| | | | |
|---|---|---|---|
| 6,685,560 | B1 | 2/2004 | Hughes |
| 6,692,354 | B2 | 2/2004 | Tracy et al. |
| 6,712,699 | B2 | 3/2004 | Walker et al. |
| 6,790,141 | B2 | 9/2004 | Muir |
| 6,837,793 | B2 | 1/2005 | McClintic |
| 6,869,361 | B2 | 3/2005 | Sharpless et al. |
| 6,887,159 | B2 | 5/2005 | Leen et al. |
| 2003/0036430 | A1 | 2/2003 | Cannon |
| 2003/0047874 | A1 | 3/2003 | Leen et al. |
| 2003/0064766 | A1 | 4/2003 | Gauselmann |
| 2003/0064807 | A1 | 4/2003 | Walker et al. |
| 2003/0114218 | A1 | 6/2003 | McClintic et al. |
| 2003/0119576 | A1 | 6/2003 | McClintic et al. |
| 2003/0224852 | A1 | 12/2003 | Walker et al. |
| 2004/0087368 | A1 | 5/2004 | Gauselmann |
| 2004/0106448 | A1 | 6/2004 | Gauselmann |
| 2004/0132524 | A1 | 7/2004 | Ramstad et al. |
| 2004/0204226 | A1 | 10/2004 | Foster et al. |
| 2004/0204235 | A1 | 10/2004 | Walker et al. |
| 2004/0235552 | A1 | 11/2004 | Gauselmann |
| 2005/0014554 | A1 | 1/2005 | Walker et al. |
| 2005/0026674 | A1 | 2/2005 | Wolf et al. |
| 2005/0059468 | A1 * | 3/2005 | Cannon .......................... 463/19 |
| 2005/0148382 | A1 | 7/2005 | Fox |
| 2005/0187008 | A1 | 8/2005 | Nakajima |
| 2005/0192073 | A1 | 9/2005 | Nakajima |
| 2005/0282628 | A1 | 12/2005 | Beatty et al. |

* cited by examiner

WAGERING GAME WITH COLLECTION OF OBJECTS TO INFLUENCE GAME OUTCOME

CROSS-REFERENCE TO RELATED APPLICATION

This application claims the benefit of the U.S. Provisional Application 60/628,417 filed on Nov. 16, 2004 and entitled "Wagering Game With Collection Of Objects To Influence Game Outcome" and this provisional application is hereby incorporated by reference in its entirety.

TECHNICAL FIELD

The present disclosure relates generally to wagering games and, more particularly, to a wagering game permitting collection of objects to influence game outcome and permitting group collection of objects to influence game outcome.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, gaming terminal operators strive to employ the most entertaining and exciting terminals available because such terminals attract frequent play and, hence, increase profitability for the operators. Thus, in the highly competitive gaming terminal industry, there is a continuing need to develop new types of games, or improvements to existing games, that will enhance the entertainment value and excitement associated with the games.

One concept that has been successfully employed in existing gaming terminals to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

Another concept that has been employed is that of a secondary or "bonus" game which may be played in conjunction with a "basic" game. The bonus game may include any type of game, either similar to or entirely different from the basic game, initiated by the occurrence of certain pre-selected events or outcomes of the basic game. Such a bonus game has been found to produce a significantly higher level of player excitement than the basic game alone because it provides an additional chance to play, which increases the player's overall expectation of winning.

In many existing gaming terminals, the basic game and the bonus game are played on an individual, stand-alone basis wherein each player plays and wins at his or her own gaming terminal without any active involvement or participation from other players at other gaming terminals. In other more recent developments in the gaming industry, provisions have been made for group play and/or group communication, such as disclosed in co-pending U.S. Pat. Application No. 60/570,583 (titled "Bank Wagering Game"), Ser. No. 10/369,021 (titled "Communication Between Players At Gaming Terminals") filed Feb. 19, 2003, and Ser. No. 10/612,478 (titled "Gaming Machine Having A Community Game With Side Wagering") filed Jul. 2, 2003, each of which is owned by the assignee of the present application and is hereby incorporated by reference in its entirety.

Accordingly, a need exist for a gaming terminal capable of providing increased excitement and entertainment value over existing gaming terminals.

SUMMARY

The present concepts are directed to a method and system for conducting a wagering game, particularly a wagering game wherein a plurality of gaming terminals are linked together to permit a plurality of players to participate in a group game or a group-wagering game.

In one aspect, a wagering game system is provided and includes a gaming control system configured to conduct a group game for a plurality of gaming terminals and to assign at least one object to the group game following the occurrence of a winning combination or event on a gaming terminal in association with the player at the gaming terminal. Upon satisfaction of a predetermined triggering event on at least one of the plurality of gaming terminals or within the group game, a realization event occurs and provides an award for a selected group of objects in the group game at a time of the predetermined realization event. In various aspects, the group game may comprise a stand-alone game, a bonus game, or a secondary game.

In another aspect, a method of conducting a group game involves a method of conducting a group game involving a plurality of gaming terminals, comprising the steps of permitting a player at each gaming terminal to collect one or more objects in a group game, displaying objects collected by each player on a display, initiating a realization event in response to a triggering event, and assigning at least one recipient of the realization event, the recipient having at least one object in the group game. In various aspects, the triggering event may comprise a combination of indicia on a gaming terminal, a sequence of indicia on a plurality of gaming terminals, or a predetermined minimum valuation of objects in the playing space and a combination of indicia on at least one gaming terminal. The realization event may comprise, for example, the arrival of an entity to a portion of the playing space which bestows upon players having objects disposed within the portion of the playing space a benefit comprising at least one of an award. The noted portion of the playing space may comprise a path from one end of the playing space to another end of the playing space. In another aspect, the realization event may comprise the arrival of an entity to a portion of the playing space and which bestows upon players having objects disposed within the portion of the playing space a benefit comprising at least one of an award and which bestows another award upon players having objects disposed adjacent the portion of the playing space.

In another aspect, a gaming terminal connected to a network for playing a group wagering game, comprises at least one display for displaying a wagering game conducted at the gaming terminal. In response to one of a plurality of predetermined events at a gaming terminal, at least a portion of a value of an award or a wager input from a player at the gaming terminal is applied to the group wagering game to acquire an object therein. In embodiments thereof, upon satisfaction of a predetermined realization event in at least one of the wagering game and the ancillary game, an award is awarded corresponding to a subset of the group of objects present in the ancillary game at a time of the predetermined realization event or an award is awarded to a player in an amount substantially corresponding to a value of objects applied by the player to the ancillary game at a time of the predetermined realization event. In other embodiments, upon satisfaction of a predetermined realization event in at least one of the wagering game and the ancillary game, an award is awarded to a player in an amount substantially corresponding to a multiple of a value of objects applied by the player to the ancillary game at a time of the predetermined realization event or an award is awarded to a player having objects arranged in a randomly selected portion of a playing space at a time of the predetermined realization event.

In yet another aspect, a method of conducting a group wagering game at a plurality of linked gaming terminals, each of the gaming terminals conducting a terminal-level wagering game, includes receiving a wager input from a player at one of the plurality of gaming terminals for the terminal-level wagering game, randomly selecting an outcome from a plurality of outcomes for the terminal-level wagering game, at least one of the plurality of outcomes resulting in an award to the player, and assigning at least a portion of a value of the wager input or the award in the terminal-level wagering game to an object in the group wagering game. In various embodiments, the method further includes the step(s) of correlating the object to at least one of the gaming terminal and a player at the gaming terminal, correlating at least one of a size and an appearance of the object to generally correspond to a value of the object, and/or awarding an award to the at least one of the gaming terminal and a player at the gaming terminal if a location of the object correlated thereto corresponds to a randomly selected award-win area of the group game gaming space.

In yet another aspect, a method of conducting a group wagering game at a plurality of linked gaming terminals, each of the gaming terminals conducting a terminal-level wagering game, includes receiving a wager input from a player at one of the plurality of gaming terminals for the terminal-level wagering game, randomly selecting an outcome from a plurality of outcomes for the terminal-level wagering game, at least one of the plurality of outcomes resulting in an award to the player, and assigning at least a portion of a value of the wager input or the award in the terminal-level wagering game to an object in the group wagering game. In various embodiments, the method further includes the step(s) of correlating the object to at least one of the gaming terminal and a player at the gaming terminal, correlating at least one of a size and an appearance of the object to generally correspond to a value of the object, and/or awarding an award to the at least one of the gaming terminal and a player at the gaming terminal if a location of the object correlated thereto corresponds to a randomly selected award-win area of the group game gaming space.

In another aspect, a method of operating a gaming terminal in accord with the present concepts includes the acts of receiving a wager from a player, conducting a wagering game on the gaming terminal, using at least one input by the player to determine an outcome of the game, displaying an outcome of the game on the gaming terminal, and assigning at least a portion of a value of at least one of an award and the wager to an object in a group game. The method also includes maintaining the object in the group game in association with the player until the object is withdrawn by the player, withdrawn from the group game in consideration for an award, or transferred to another player of the group game by the player. This method may further include the step of displaying at least one of the assigning step and the maintaining step on at least one of a main display, secondary display, and signage. This method may also include the steps of associating the award with a player's identification information and assigning the award to at least one of an account held by the player and a trust account accessible to the player.

In yet another embodiment, a wagering game system in accord with the present concepts includes a controller for conducting a group game for a group of players under the control of a gaming control system and a plurality of gaming terminals, each gaming terminal connected to the controller and being configured to conduct a group game in combination with the controller. The gaming control system is configured to contribute at least a portion of an award to each player satisfying a winning event at a gaming terminal and a wager input at a gaming terminal to build an object in a group game. In aspects of this embodiment, following building of a threshold plurality of objects in the group game, a triggering event is enabled on at least one of the gaming terminals. This triggering event, when satisfied at one of the gaming terminals, may produce a realization event available to at least one player contributing to the building of at least one object in the group game.

The above summary sets forth some examples of the present concepts, but is not intended to represent each embodiment, or every aspect, of the present concepts disclosed herein and recited in the appended claims.

BRIEF DESCRIPTION OF THE DRAWINGS

The following drawings are provided to illustrate various aspects of the concepts detailed herein, wherein.

Figure 1:
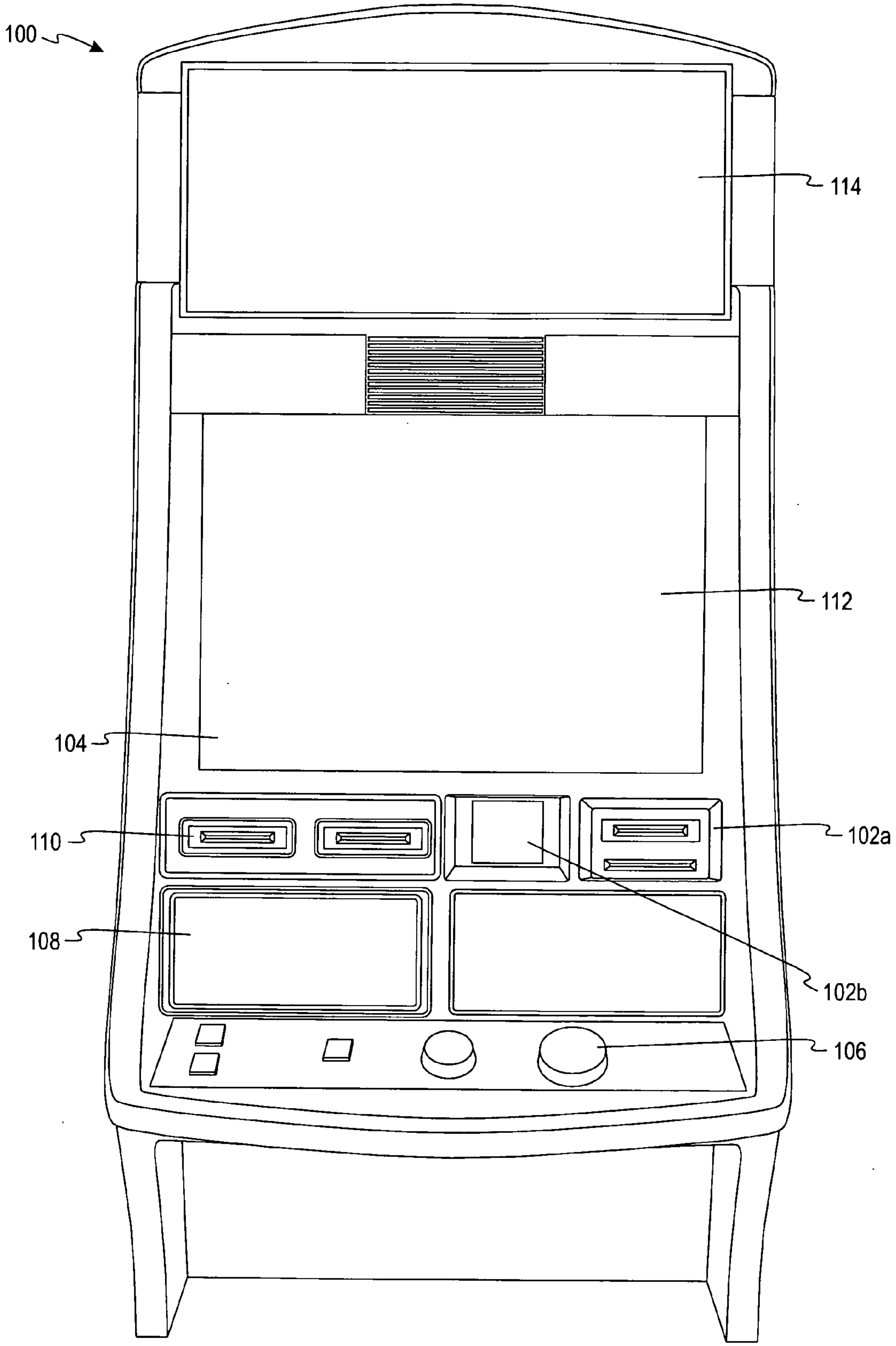
FIG. 1 illustrates a gaming terminal which may be used in accord with the present concepts.

While the present concepts are susceptible to various modifications and alternative forms, specific embodiments have been shown by way of example in the drawings and will be described in detail herein. It should be understood that the present concepts are not intended to be limited to the particular forms disclosed, but are intended to include all modifications, equivalents, and alternatives falling within the spirit and scope of the present concepts disclosed herein.

DETAILED DESCRIPTION

A wagering game permitting collection of objects and permitting group collection of objects to influence game outcome is provided herein, as described by way of example in the accompanying examples. In one exemplary, non-limiting aspect of the present concepts, the game outcome which is influenced by the group collection of objects is a bonus game. Moreover, it is to be understood that the noted group collection of objects is intended to reflect a capability for group collection of objects rather than a requirement that the collection must be by a group. The concepts disclosed herein include collection of objects by an individual player to influence game outcome within the larger context of a group game therefor.

FIG. 1 shows a representation of an exemplary gaming terminal 100 according to embodiments of the invention. The gaming terminal 100 may be operated as a stand-alone terminal, or it may be connected to a network of gaming terminals. Further, the gaming terminal 100 may be any type of gaming terminal and may have varying structures and methods of operation. For example, the gaming terminal 100 may be a mechanical gaming terminal configured to play mechanical slots, or it may be an electromechanical or electrical gaming terminal configured to play a video casino game such as, but not limited to, blackjack, slots, keno, and poker, and any other associated games (e.g., bonus games having a board-game theme or video-based game theme). In one aspect, the gaming terminal 100 is a video slot machine comprising conventional gaming terminal components including input devices, such as wager acceptor(s) 102, payout device 108, a main display 112, which may comprise a touch screen display portion 104, push-buttons 106, and an information reader (e.g., player-identification card reader) 110. Push buttons 106 may comprise mechanical push buttons, soft buttons, or buttons integrated with a touch-screen display, and allow players to select various options with respect to the games played on the gaming terminal 100.

The wager acceptor 102 and/or payout device 108 may include any conventional means by which wagers are processed and accepted including but not limited to a card wager acceptor and a currency (i.e., bills, coins, tokens) wager acceptor or any combination thereof. It may comprise, for example, a card wager acceptor including a card-reading device for receiving a stored value card and reading a recorded monetary value associated with the card. The card wager acceptor may also facilitate communication to a remote account, through a controller 210, described below, and a communications system to permit transfer of money from a player's bank credit account, banking account, or room number (e.g., for guests of a casino having pre-authorized credit) to the gaming terminal 100. The wager acceptor 102 and/or payout device 108 may alternatively include a RF reader for reading a RF device encoded with credit and/or monetary information.

A biometric sensor may optionally be provided to could uniquely identify the player and link the gaming terminal 100 to an account or line of credit extended to that player by the casino. The player-identification card reader 110, if present, would similarly be provided to read an identification card and extract information therefrom regarding the player's identity for players enrolled in the participating gaming establishment's players' club.

The main display 112 displays information about the game being played, such as a basic wagering game or a group game, and may take a variety of forms. For example, the main display 112 may be a conventional 3-slot or 5-slot mechanical reel, or it may take the form of a cathode ray tube (CRT), a liquid crystal display (LCD), a plasma display, or any other type of display that is suitable for displaying images, such as simulated mechanical reels, related to a wagering game. Secondary display 114 may comprise similar or different display types and may be operatively configured to display the basic wagering game and/or another game, such as a secondary game, bonus game, or progressive game or information about such games.

It should be understood that numerous other elements may exist and may be used in any number of combinations to create various forms of a gaming terminal. Further, one or more of the indicated features may be omitted or combined in accord with the present concepts.

Figure 2A:
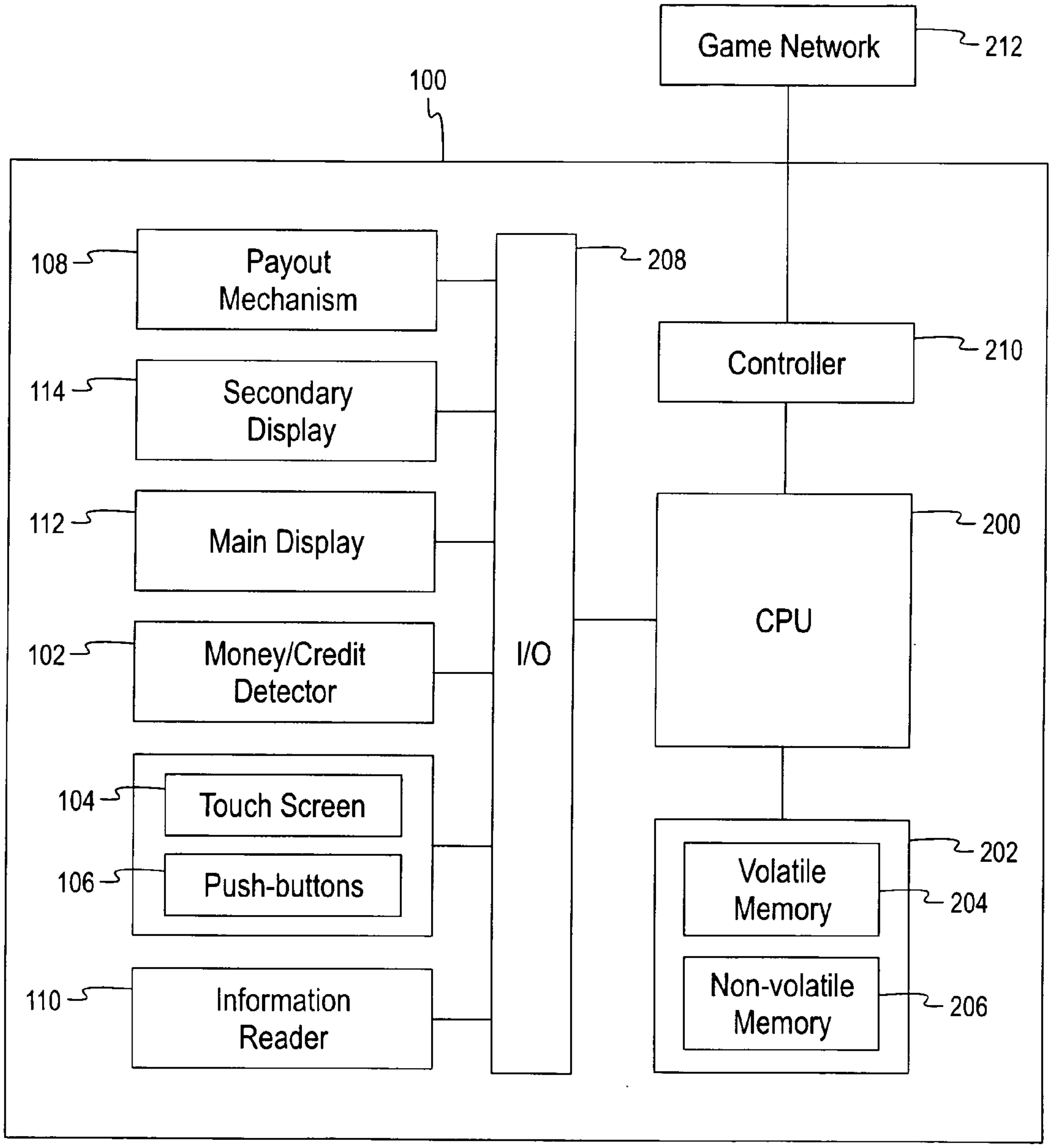
FIGS. 2(*a*)-2(*b*) respectively show a functional depiction of the gaming terminal shown in FIG. 1 and a group of wagering game terminals connected in a network in accord with at least one aspect of the present concepts.
Figure 2B:
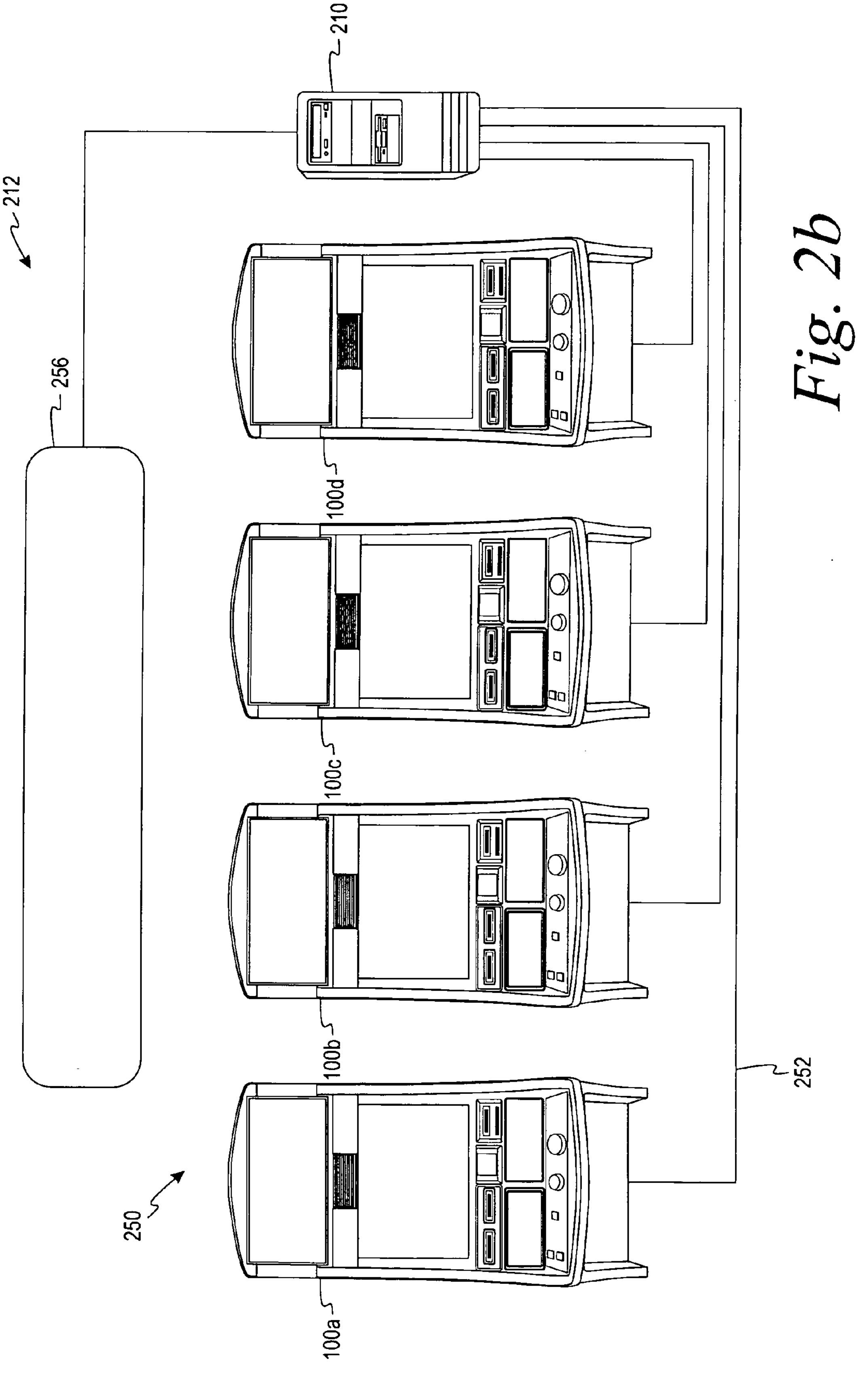

Gaming terminal 100 is controlled by a central processing unit (CPU) 200, comprising one or more processors, which executes one or more programs, routines, or instruction sets associated with a gaming control software, which comprises part of an overall gaming control system. The gaming control software randomly selects the outcomes for the gaming terminal 100 and controls the overall operation of the gaming terminal. The gaming terminal 100 may include, as shown in FIG. 2(*a*) a storage unit 202 that includes one or more volatile memories 204 (e.g., a random-access memory (RAM)) and/or non-volatile memories 206 (e.g., hard drive, optical drive, an EEPROM). The gaming terminal 100 and associated gaming control system is capable of locally executing and displaying various wagering games including, but not limited to, a slot machine game, a lottery game, a card game and other conventional types of terminal-level and networked or remote wagering games.

The gaming terminal 100 and associated gaming control system is capable of executing such wagering games on or through a controller 210. Controller 210, as used herein, comprises any combination of hardware, software, and/or firmware that may be disposed or resident inside and/or outside of a gaming terminal 100 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least on other processing device. The controller 210, as used herein, may comprise one or more controllers. In one implementation, each gaming terminal 100 comprises, or is connected to, a controller 210 enabling each gaming terminal to transmit and/or receive signals, preferably both, in a peer-to-peer arrangement. In another example, the controller 210 may be adapted to facilitate arrangement of one or more gaming terminals 100 in a client/server or centralized arrangement. In one aspect, shown in FIG. 2(*a*), the controller 210 comprises a NIU (Network Interface Unit) connecting the gaming terminal 100 via a conventional I/O port and communication path (e.g. serial, parallel, IR, RC, 10bT, etc.) to a network or service 212, which may include, for example, other gaming terminals connected together in a network. In another aspect, shown in FIG. 2(*b*), the controller 210 comprises a server connected to a plurality of gaming terminals 100*a-d*.

The gaming control system 200 comprises software or instructions, embedded within firmware and/or stored in a memory device, which may be executed on one or more processors to control at least one of the basic wagering game and another game, such as a group game. The gaming control system 200 may be associated with hardware, firmware, memory devices and/or equipment separate from the gaming terminal(s) 100 and/or controller 210. Alternatively, the gaming control system 200 may reside within and/or be executed by, in whole or in part, the gaming terminal(s) 100 and/or controller(s) 210.

The gaming terminal 100 may be a stand-alone terminal, or it may be part of a network 212 that connects multiple gaming terminals 100 together in a peer-to-peer network, a client/server network, or other network architecture. FIG. 2(*b*) illustrates an example where the network 212 is a client/server network. The network 212 includes a group 250 of gaming terminals 100*a*, 100*b*, 100*c*, 100*d* connected via network connections 252 (e.g., Ethernet-TCP/IP) to a controller 210 which, in this example, comprises a server. The gaming terminals 100*a*-100*d* are similar to the gaming terminal 100 (FIG. 1) and allow players to play a basic, terminal-level wagering game and another game. Although four gaming terminals 100*a-d* are shown located in the general vicinity of one another in view of the area signage 256, the present concepts include groups 250 comprising a greater or a lesser number of gaming terminals disposed in any grouping, placement, or location(s).

In some aspects, one or more functions of the gaming terminals 100*a*-100*d* may reside on the controller 210 instead of, or in addition to, the gaming terminals 100*a*-100*d*. The controller 210 may then conduct the basic and/or bonus games (or portions thereof) for each of the gaming terminals 100*a*-100*d* connected to the network 212, including providing the input data and information needed to operate the basic and/or bonus games. In addition to the basic wagering game, the gaming terminals 100*a-d* also allow players to participate in another game, such as a group-game conducted by the controller 210.

In a basic wagering game conducted at a gaming terminal, eligible players are awarded a prize (e.g., cash, credits, gifts certificates, etc.) outright, without any further requirement for participation. Other prizes may include entry into another game, such as a secondary game, bonus game, or progressive game, which provides further opportunity for an award, which is used generically herein to refer to any benefit bestowed upon a player regardless of terminology, form, and amount, and may optionally provide enhanced odds of attaining such award.

The group game may itself be the basic wagering game or the group game may comprise another game (e.g., a secondary, bonus, or progressive game) associated with a basic wagering game played individually by players at respective gaming terminals. The group game advantageously incorporates, at least one gaming terminal main display 112, secondary or box top display 114, or area display 256 in the vicinity of one or more of the gaming terminals, such as shown in FIG. 2(*b*), configured to display animation taking the form of hand-drawn animation showing an action, computer animated action, video or film representations, or such types of animation comprising one or more still images, displayed in response to events during the group game. The animation also includes objects and elements which are inserted, removed, and/or moved relative to a background scene and need not comprise an entirety of any given type of display. These types of animation may convey one or more results corresponding to a selected option and will typically, but not necessarily, have a common theme or thematic element, which may comport with a theme of the basic wagering game and/or gaming terminal. Examples of gaming animation is discussed in U.S. Pat. No. 6,592,457 and U.S. Patent Application No. 20040053686 titled "Gaming machine performing real-time 3D rendering of gaming events" to Pacey et al., which are each incorporated by reference herein in their entirety.

As used herein, the terms group-wagering game play and/or group-wagering game platform connote a requirement for players to place additional wagers during the group game, whereas the terms group-play gaming or group-play gaming platform connote group game play in a bonus game, secondary game, ancillary game, ancillary game or other game arising out of a basic wagering game wherein an initial wager is placed within a basic wagering game and additional wagers are not required as a prerequisite for continued play during such bonus game, secondary game, ancillary game, ancillary game or other game. The group-play gaming or gaming platform does not prohibit, however, placement of additional wagers during group game play to facilitate or enhance game play and/or awards or prizes available therein. In other words, the present concepts generally embrace group game play in any aspects, regardless of when the wagers are input or accounted for to enter into the group game play and whether or not the group game is a stand-alone game or exists as a part of or adjunct to another game (e.g., a bonus game). The term group game will be used hereinafter to encompass such group-wagering game, group-play games, and any other type of game play involving a plurality of players at a plurality of gaming terminals or gaming terminal stations (i.e., a single gaming terminal having a plurality of stations). The group game optionally may comprise a progressive game and/or a persistent state group game, which would permit individual players to enter and exit the game at will without loss of objects held thereby in the group game.

FIGS. 3-8 show representations of various screen display illustrative of the present concepts. These representations are clearly basic in nature and are not intended to constitute any commercial embodiment of or limitation on the present concepts, but are merely presented to illustrate various concepts of game play in accord with the present concepts.

Figure 8:
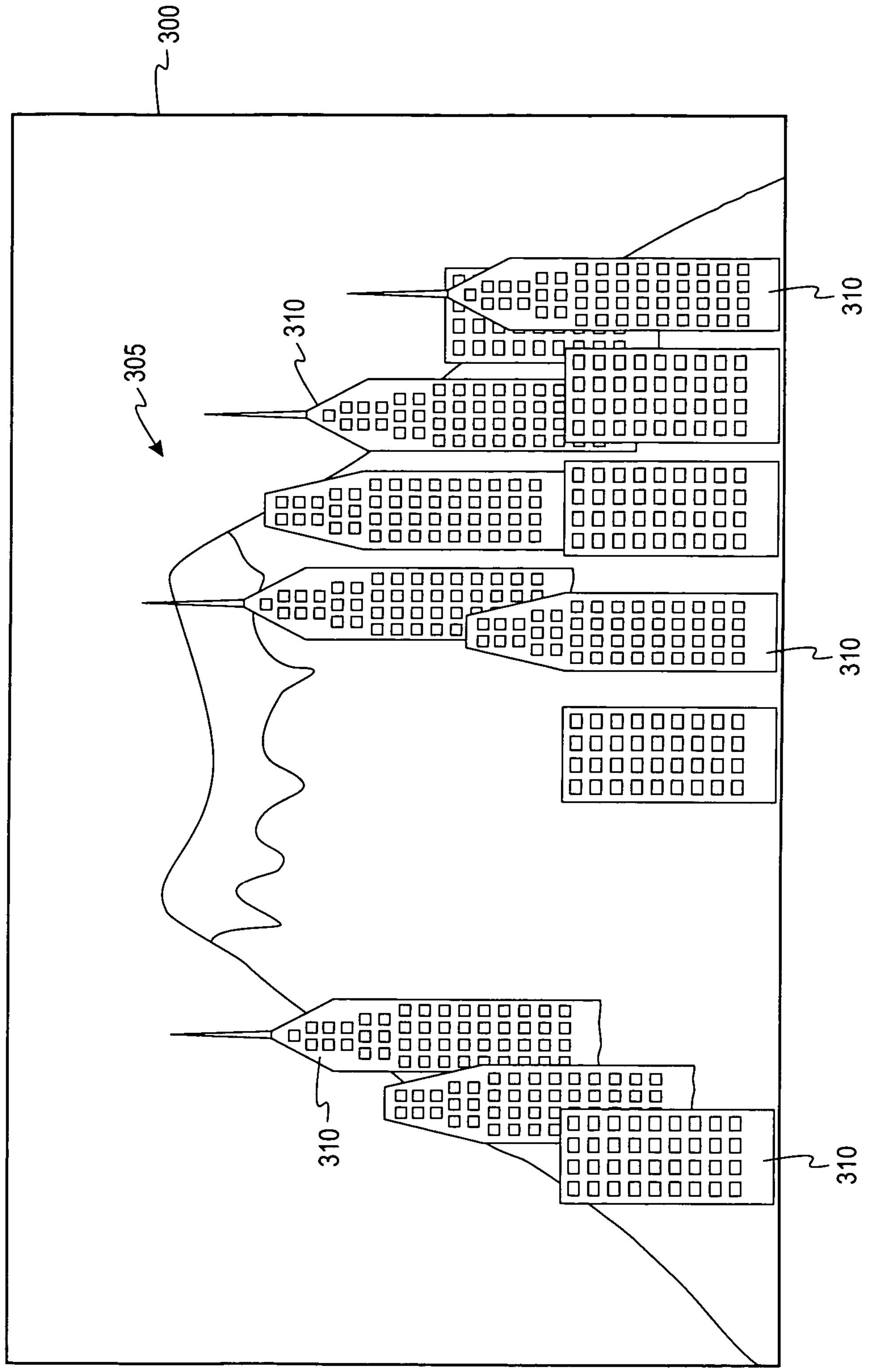
FIG. 8 shows a representation of a sixth screen display in accord with at least some aspects of the present concepts.

Generally, the present concepts include a group game wherein players contribute to the collecting and/or building of objects within a group game gaming space. At some point during group game play, a realization event will occur which will affect various objects within the group game gaming space. The players having objects so affected by the realization event will be assigned an award. The affected objects are removed from the group game gaming space and group game play continues. In one aspect of these concepts, discussed in greater detail below, the group game gaming space is a representation of a city or city-scape. When a player achieves a winning combination or event on a gaming terminal, one or more buildings associated with the player is disposed in the city (e.g., the size, value, and/or number of buildings may correspond to the particular winning combination or event). At some point during the group game, CASHZILLA appears (e.g., a realization event) in FIG. 6 to destroy portions of the city, or some other representation of a realization event manifests to influence the gaming space in a manner that will yield at least one award to at least one player. In the example of CASHZILLA, buildings that are destroyed 315 or otherwise affected by CASHZILLA (see FIG. 7) are converted to awards, which are then paid out to the players associated with those destroyed buildings. The destroyed buildings 315 are then removed from the city, such as shown in FIG. 8, and group game play continues.

Figure 3:
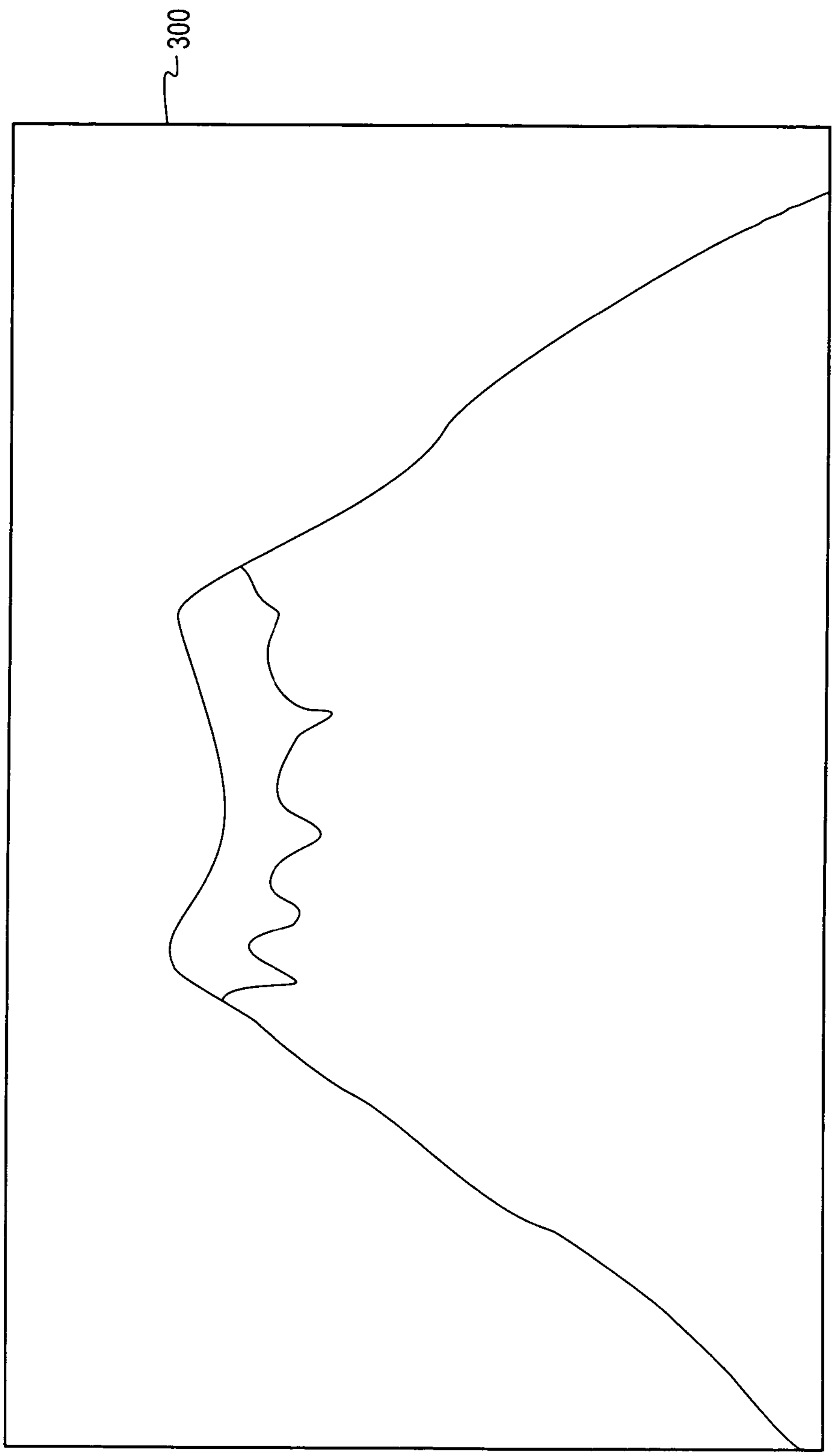
FIG. 3 shows a representation of a first screen display in accord with at least some aspects of the present concepts.
Figure 4:
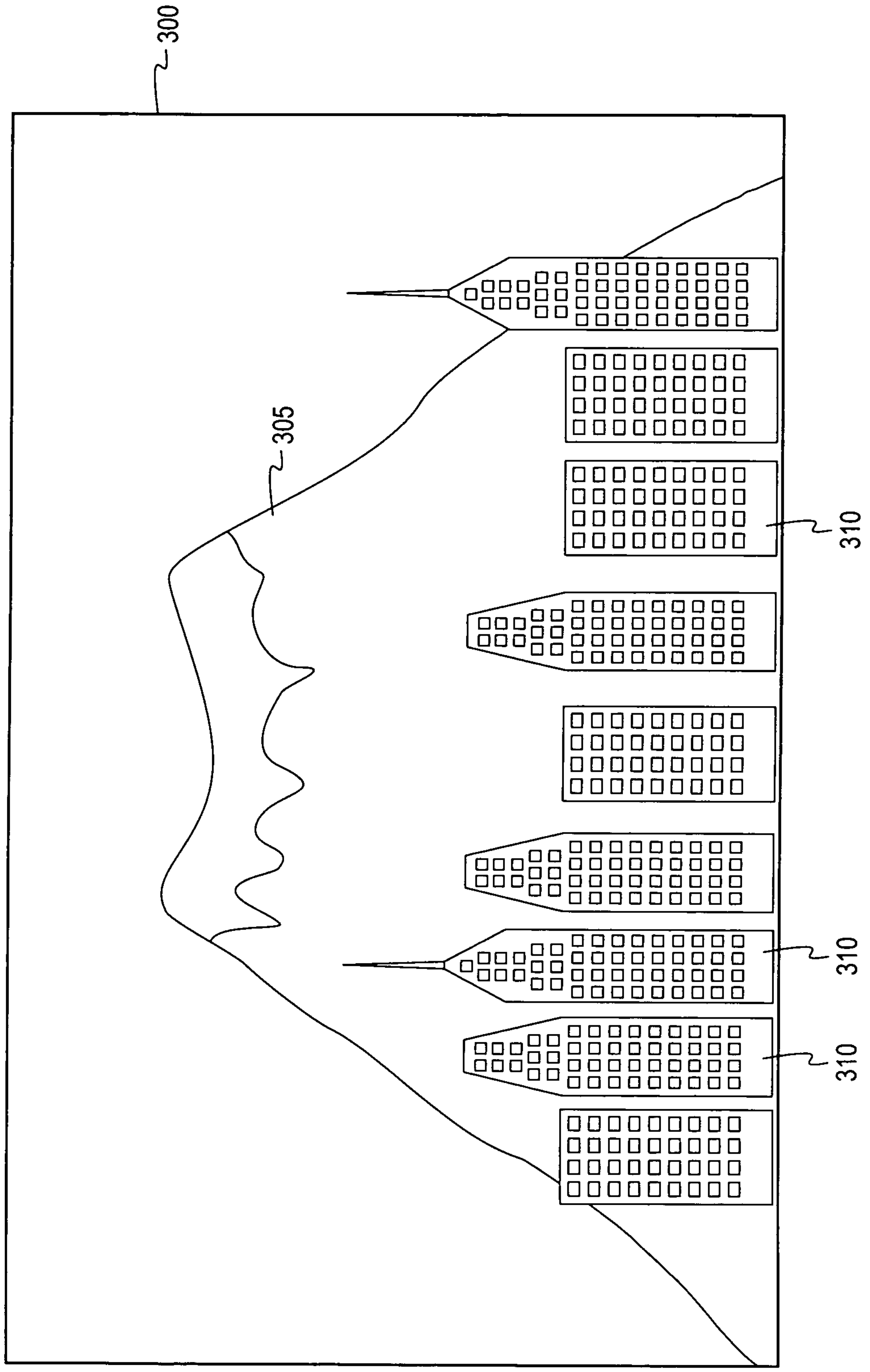
FIG. 4 shows a representation of a second screen display in accord with at least some aspects of the present concepts.
Figure 5:
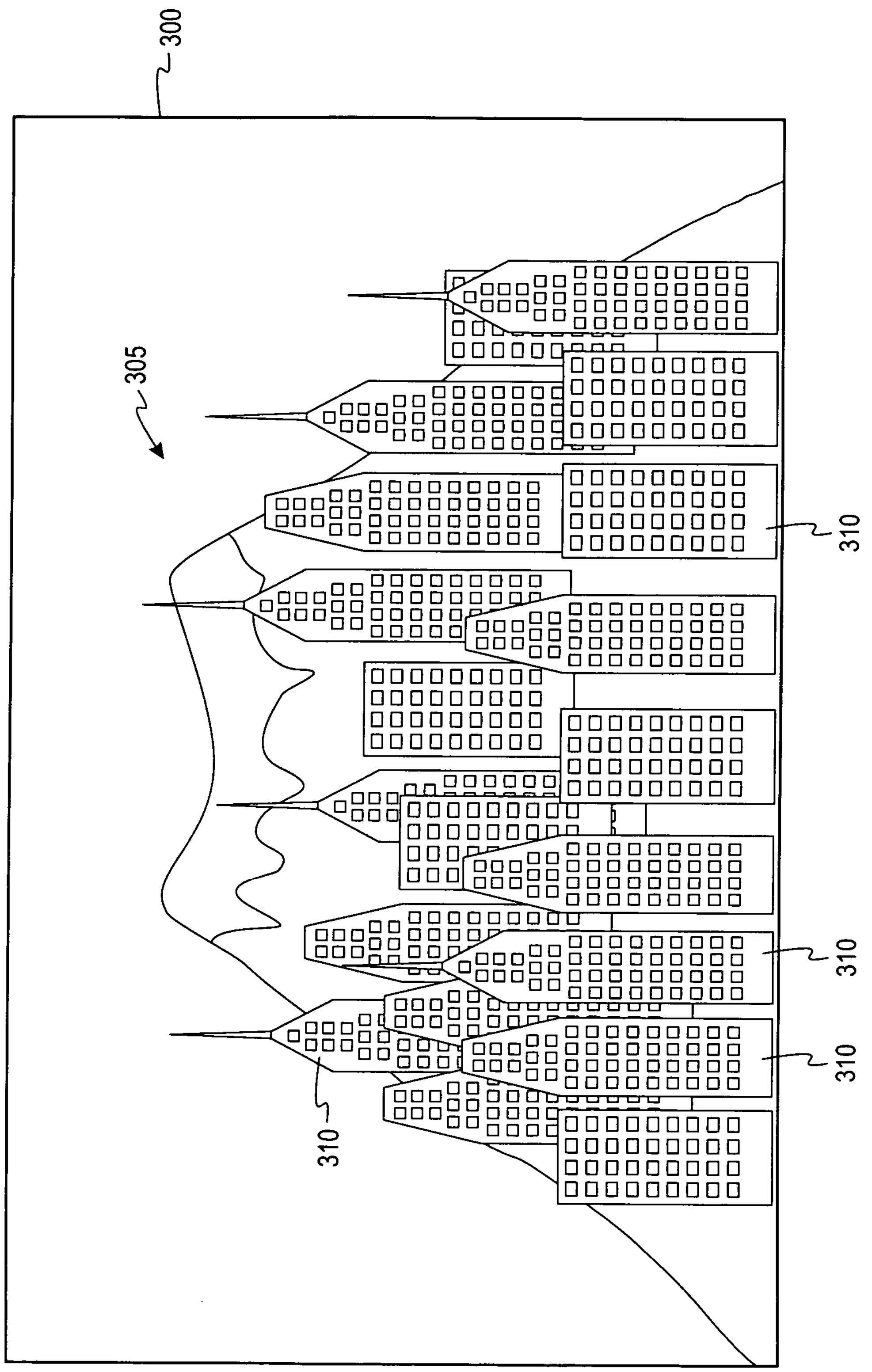
FIG. 5 shows a representation of a third screen display in accord with at least some aspects of the present concepts.
Figure 6:
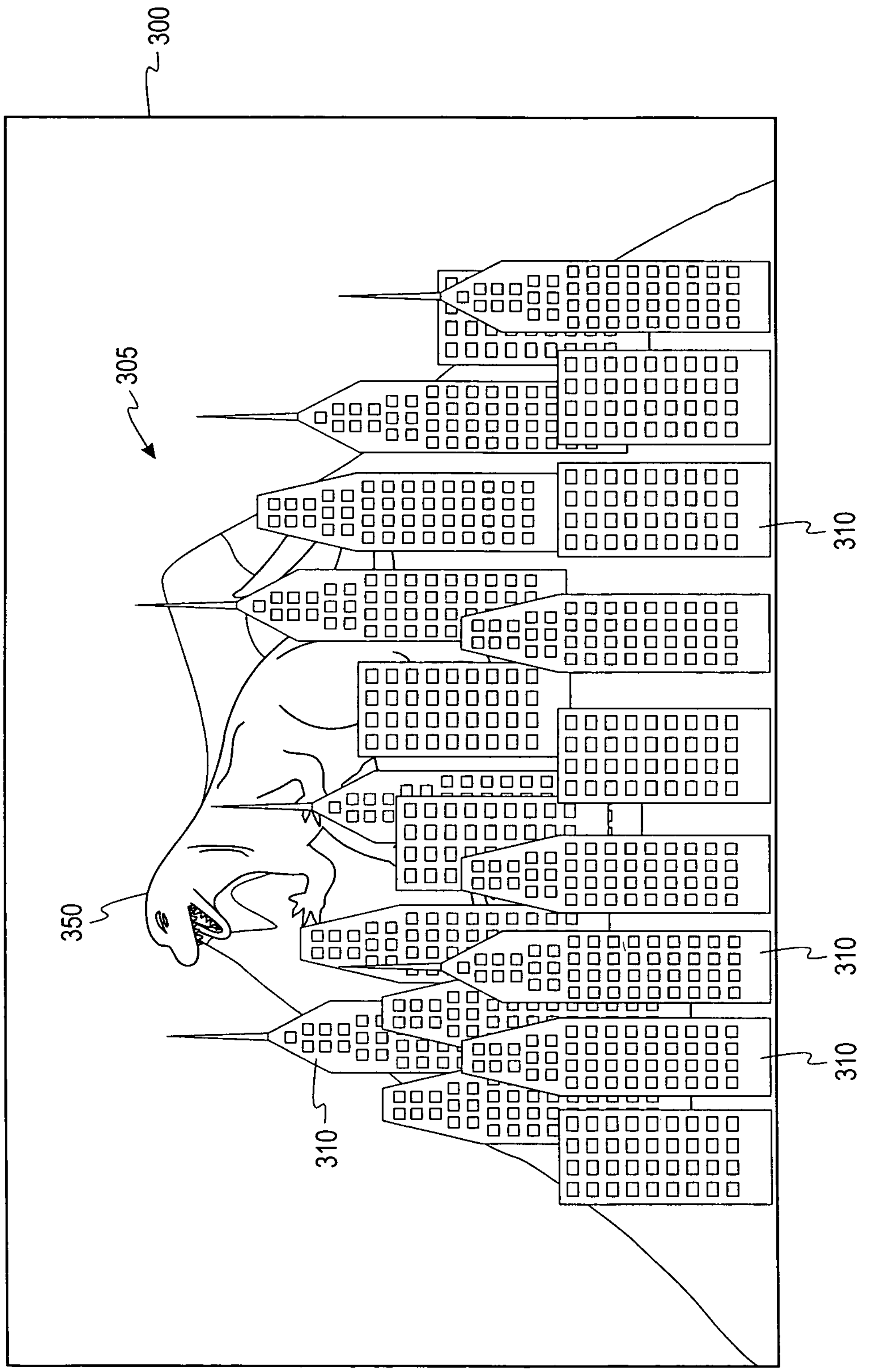
FIG. 6 shows a representation of a fourth screen display in accord with at least some aspects of the present concepts.
Figure 7:
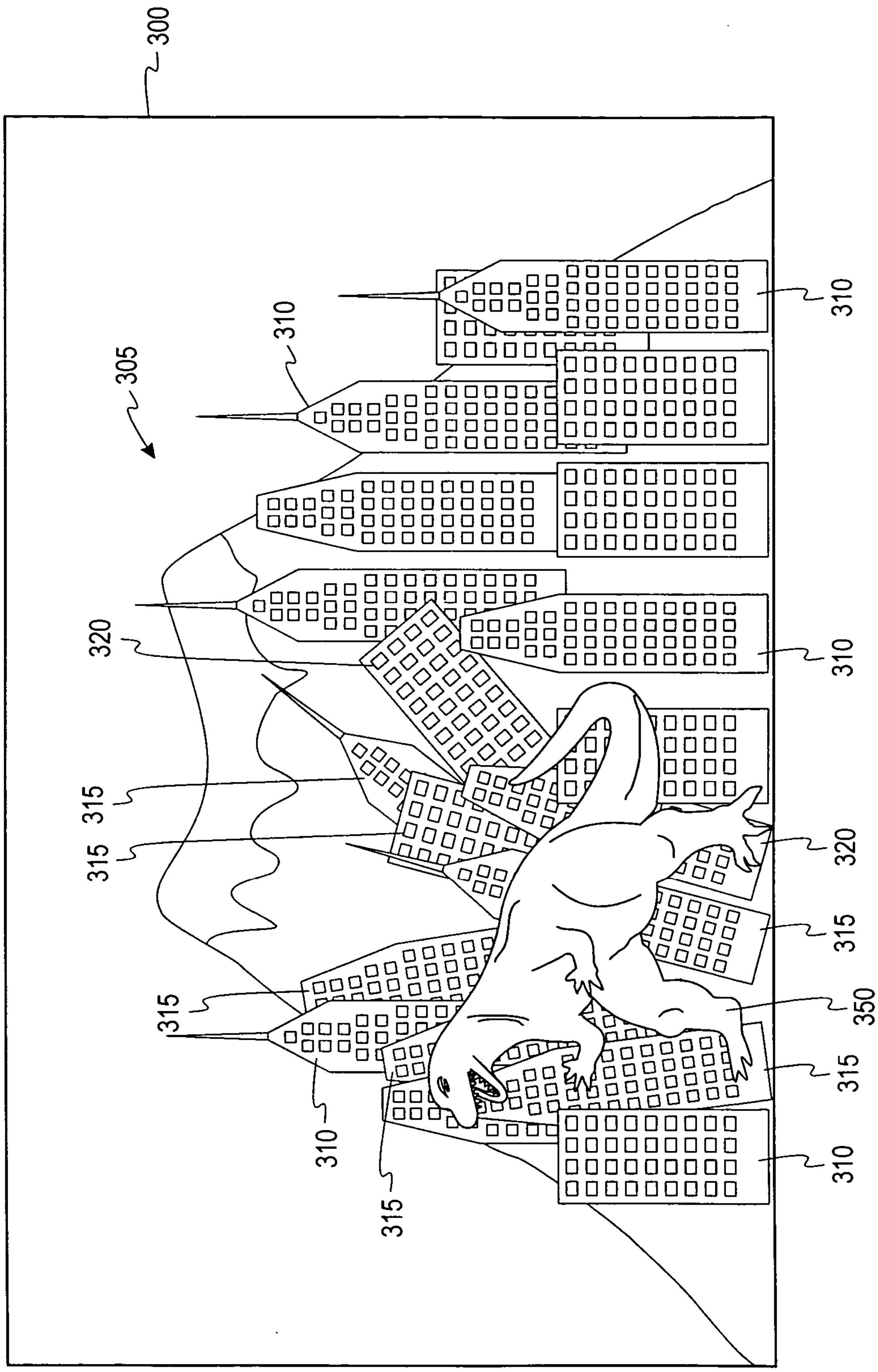
FIG. 7 shows a representation of a fifth screen display in accord with at least some aspects of the present concepts.

In FIG. 3, a screen displayed on one or more displays (e.g., a portion of a gaming terminal main display 112, a secondary or box top display 114, and/or on signage 256 in the vicinity of one or more of the gaming terminals), shows a background for a site upon which players will collectively build or collect an object or objects. In the present example, the object is a city. In other aspects, the object could be a specific structure, such as a bridge, building, pyramid, or the like, or the object could be something as mundane as crops, flowers, or the like. In still other aspects, the object could be larger than a city, inclusive of a city-state, state, district, country, or region. As noted, the theme could require collection of objects. In one example, the players could be presented with a quest to collect various objects The object can vary in size, scope, and purpose accordingly with a desired game theme. Each player in a group of players is permitted to, in concert with other players, collectively build or collect an object or a group of objects within the group game. Preferably, this collecting and/or building of objects is accomplished within a contextual base thematically linking the objects. In one example, the contextual base is a city and the objects are those typically associated with a city, such as buildings, roads, bridges, and the like. The player or players work(s) to construct or build a city by building and/or collecting various objects associated with the city. The contribution of each participant may be localized, rather than each individual contributing to every part of the whole. For example, a player may contribute to a portion of a building, rather than to an entire building. Alternatively, the contribution of each participant may be contained in every part of the whole, or in every part of a subgroup of the whole (e.g., a plurality of players collectively build a whole of a subpart to the whole). At some point in time, a realization event occurs which will affect at least some of the objects in the group game and correspondingly bestow an award upon players whose objects or portions of objects are so affected.

The value of objects within the group game may be related to a specific winning combination or event on the player's gaming terminal 100. For example, a winning combination with a lower probability of occurrence may be assigned a potential value in the group game that is higher than a winning combination with a relatively higher probability of occurrence. This value may further be influenced by the player's wager, with correspondingly higher wagers being associated with higher multipliers or values of attributed to the particular winning combination. For example, a player could place a 2-credit wager and receive, for a winning condition, an 18-floor building 310 within the group game gaming space 300, whereas a 5-credit wager for the same winning condition might result in a 45-floor building within the group game gaming space. The value of an object (e.g., building 310) within the group game gaming space 300 may also be enhanced by the game play of other players. For example, players may be permitted to build upon buildings of other players, such as to create a 60-story building from the above-noted 45-story building, which may increase the overall value of the property, which could be manifested as an increased multiplier for each contributor thereto if such building is selected to benefit from a realization event. In yet another aspect, a winning combination may optionally be supplemented by a supplemental wager in the group game.

In the illustrated example, the group game gaming space 300 comprises buildings 310 applied to or distributed within a larger entity (e.g., a city 305). In one aspect, the application or distribution of the objects within the larger entity is randomly assigned by the computer or gaming control system 200 to one of a plurality of available positions within the larger entity. Thus, a player's building 310 can be assigned to any random vacant site in a city 305. Alternatively, the player may be provided the option of selecting any vacant site in the city 305.

The gaming control system 200 may, in various aspects, employ any one of a plurality of weighted distributions to control and/or vary the objects or developments within the group game gaming space 300. In effect, the gaming control system 200 may impose zoning ordinances to facilitate an orderly and somewhat realistic creation of an entity such as a city 305. These distributions or controls may be varied among subsequent gaming sessions to produce entities having a different look in each iteration of the group game. In one aspect, a particular area of the entity's real estate could be reserved for high-value objects or structures (e.g., high-rises of a certain stature) at a first density, whereas lesser areas of the entity's real estate could be open to any value of object or structure. In another aspect, the value of the object may be weighted (e.g., increased or decreased) based upon the value of the object (e.g., building) relative to the larger entity (e.g., city). For example, the players may be randomly assigned a building or structure 310, from a plurality of such buildings or structures. Certain buildings, for example, may be arbitrarily or randomly associated with a higher award multiple or may be assigned an increased probability of an award (e.g., attracting the attention of CASHZILLA 350), which may or may not be visually evident to the player. Thus, a wide variety of objects may be implemented within a group game gaming space to add addition flavor and/or realism to the gaming environment and optionally to facilitate the implementation of numerous arbitrary opportunities for assignment of additional awards to the players.

Upon satisfaction of a predetermined realization event in the basic wagering game and/or the group game, an award is awarded for objects present in a randomly determined portion of a gaming space 300 in the group game at a time of the pre-determined realization event. In one aspect, the pre-determined realization event is a randomly generated event. During game play, whether in the basic wagering game or in the group game, a trigger to initiate a realization event for the group may include, for example, a particular symbol or sequence of symbols displayed on a gaming terminal 100, such as those occurring on a pay-line of a gaming terminal 100 associated with the group game. Such occurrence of the particular symbol or sequence of symbols may be a random event with a probability or range of probabilities assigned by the gaming control system 200.

The trigger and pre-determined realization event could also be influenced by events within the group game itself (e.g., an ancillary game, supplemental game, bonus game, progressive game, etc.), including events relating to the group of objects or by a subset thereof. For example, the pre-determined realization event may comprise a particular level of building and/or collection of objects (e.g., buildings) within the group game gaming space (e.g., a city). In other words, the pre-determined realization event may comprise, at a minimum, a city 305 that is at least 50% populated with buildings, or some other randomly selected level of building and/or collecting (e.g., 30%, 40%, 60%, 70%, 75%, etc.). The pre-determined realization event could optionally comprise the building of or completion of a particular building 310, such as a 80-story high-rise, a power-plant on the city's outskirt, or a large school, or could require a certain weighting of object value within the group game gaming space or within a pre-selected area. The pre-determined realization event could comprise the random juxtaposition of certain types of buildings 310 within a pre-determined area or adjacent one another. Moreover, the pre-determined realization event may be randomly selected from a plurality of pre-determined realization events, dozens or even hundreds, to introduce sufficient variability of game play to maintain gaming excitement and to mitigate or prevent gaming of the system.

Thus, the predetermined realization event may include the occurrence of a predetermined event or combination of events in the basic wagering game or in the group game. In one aspect, upon the occurrence of a realization event, the basic wagering game may be instantly paused such that any spinning reels or games in play will be suspended mid-play until the completion of the realization event, at which time the play will be resumed where it was paused. In another aspect, the realization event and associated display thereof over the connected gaming terminal main displays 112, secondary or box top displays 114, and/or on signage may be momentarily paused to permit completion of the games and moves in-play at the time of the realization event.

In the illustrated example of FIGS. 3-8, the realization event comprises the appearance of "CASHZILLA" 350. The awards may be assigned or redeemed in ay number of forms centering around the CASHZILLA 350 concept, or other arbitrarily selected concept or theme. For example, CASHZILLA 350 may move from one arbitrary portion of the group game gaming space 300 (e.g., one side of the city 305) to another arbitrary portion of the group game gaming space (e.g., another side of the city). The initial and final positions of CASHZILLA 350 within the group gaming space 300, as well as the path taken therethrough, may be randomly selected or may be determined, in whole or in part, based on characteristics of or distributions of objects 310 in the group game gaming space 300.

As CASHZILLA 350 moves across the group game gaming space 300, CASHZILLA knocks over or otherwise affects (e.g., changing a color thereof to green with a cash green breath) various buildings 310, or floors thereof, and structures within its path. The buildings and structures 315 so affected may be converted to awards commensurate with a value of the building or a multiplier thereof. Further, as the affected buildings and structures 315 topple or otherwise change state, they may in turn fall upon and damage or affect other buildings, which in turn could be eligible for an award. Such collaterally damaged or affected buildings and structures 320 could receive a smaller award than the directly damaged or affected counterparts, or could receive the same award. The award provided each player for each building 310, or portion thereof (e.g., a floor), associated with the player may be a fixed amount or it may be directly related to the value of the building or portion thereof. For example, if a player has a 45-floor building, a 20-floor building, and a 30-floor segment of a building within the group game gaming space, and CASHZILLA 350 directly destroys the 45-floor building and causes collateral damage to the building having the players' 30-floor segment, the player may receive 450 credits (10× value) for the 45-floor building and 90-credits (3×) for the 30-floor segment.

In one aspect, the value of a building 310 may be initially fixed based upon the player's original line bet and the particular winning combination achieved during the basic wagering game. In an optional feature, the player may be prompted to input additional funds or wagers to influence where in the city or group gaming space the player wants to deposit the object. There may be more desirable properties or positions, from an award point of view, than other properties or positions, similar to the conventional MONOPOLY™ game. In essence, the player is placing a side bet that placing the object or property within a certain portion of the group game gaming space 300 will yield an award or yield a higher award than would placement of the object or property within another portion of the group game gaming space. In still another variant, the player may be provided the option of purchasing insurance for the building 310, object or property. For a fee or additional wager, the player may insure their property for a higher value than initially indicated. In such event, the award value for the property will be higher, if the realization event directly or indirectly touches upon the object or property. Despite the above examples, the award valuation is arbitrary and may be adjusted to suit any aspect of game play.

Players may also be given the option of leaving their buildings 310 incomplete in the hope of adding additional floors to the building. In one aspect, a group game may afford some benefit for larger buildings 310, such as increased multipliers for each floor or grouping of floors. For example, each building 310 may have a base 2× multiplier and each floor over ten may add an additional 0.1× multiplier for the whole of the building (e.g., a 20-floor building would have a 3.0× multiplier and a 60-floor building would have a 7.0× multiplier). Since the benefit does not, in this aspect, require additional wagers by the players, the players are provided an incentive to delay completion of the building 310 to add additional floors to the building before completing or capping the building. In some aspects of the present concepts, buildings 310 must be complete to receive an award based on the realization event these players take a risk in not completing the building since the realization event may occur at any time. The control of the building of a building 310 may be left entirely up to the player, or the gaming control system may automatically complete or cap buildings upon some predetermined criteria (e.g., a predetermined delay period or a predetermined indicia or symbol, or plurality thereof, occurring during the basic wagering game). In another aspect, players may be permitted to add their levels to another player's building 310 and then cap that building. For example, player one has an uncapped or incomplete 20-floor building and player two has just satisfied a winning event in a basic wagering game and wants to apply the equivalent of 20-floors to a building within the ancillary game. In lieu of selecting a 20-floor building, player two may decide to add his or her 20-floors to player one's building to form a 40-floor building, which player two may then complete or cap. Player one is thus permitted to benefit from the actions of player two.

The duration of the realization event may also be altered based on events during game play in the group game or in the basic wagering game. For example, a sequence of symbols on a 5-reel game could initiate the realization event with a string of three consecutive "CASHZILLA" symbols. If another arbitrary symbol, such as a "Rampage" symbol is concurrently provided within the same payline, then the duration of the realization event may be increased or, similarly, the length of the path traveled by CASHZILLA 350 from one portion of the group game gaming space 300 (e.g., one side of the city 305) to another portion of the group game gaming space (e.g., another side of the city) could be lengthened, such as by having a path that meanders to a greater degree than a basic path. Thus, the number of properties potentially affected would increase. As with other factors, the duration of the realization event may also be affected by events within the group game itself. For example, the duration of the predetermined realization event may be influenced by a distribution of the group of objects such as, but not limited to, a grouping of high-value objects in one portion of the group game gaming space 300, which may increase the probability that CASHZILLA 350 will deviate from an initially determined path across the group game gaming space, which would thereby increase the duration of the realization event.

A particular grouping of objects or particular object (e.g., a very-high building) may be assigned a probability or random probability of influencing the basic path of CASHZILLA 350 determined by the gaming control system 200. Thus, CASHZILLA 350 may be caused to deviate from an initially determined path across the group game gaming space 300 (e.g., city 305) to knock over or otherwise affect that object or grouping of objects (e.g., buildings 310). The award(s) may, for example, be awarded to randomly selected players, players having one or more objects within a randomly selected portion of the group game gaming space, and/or players having one of a plurality of specially designated objects. The award may be substantially proportional to a value of the object assigned to a player, or may be a multiple thereof.

CASHZILLA 350 may be provided with an arsenal of other devices by which awards are distributed. CASHZILLA 350 may be provided with a tail to knock over buildings 310 or objects or may be provided with bodily emissions (e.g., cash breath) which might knock over or otherwise ping an object. CASHZILLA 350 might also throw objects (e.g., money bags, other buildings, gold paint, cash, coins, etc.) to the same end. The possibilities and variations on game play are essentially endless. The present concepts require only a realization event, in some form, which renders an award or awards upon a player (or players) whose object(s) within the gaming space 300 are selected by the gaming control system 200. Such selection may be purely random, initially random with subsequent modifiers, or based on the interplay of variables within the group game.

In accord with the above-noted concepts, a method of conducting a group game is provided which involves a plurality of gaming terminals, each gaming terminal connected to a controller 210 and being controlled by a gaming control system 200, includes the steps of permitting a player at each gaming terminal to collect one or more objects, disposing the objects collected by each player within a playing space 300, providing a triggering event, initiating a realization event when the provided triggering event occurs, and randomly assigning a plurality of recipients of the realization event, each of the plurality of recipients having objects disposed within a substantially adjacent area of the playing space or along a path across the playing space. In accord with the above-noted non-limiting example, the playing space 300 is a city 305 and the objects include buildings 310, structures, facilities, infrastructure, or the like, or portions thereof. The playing space 300 could alternatively include a village, town, city, region, state, country, district, province, and/or landmass.

The disposing step may include disposing an object within an area of the playing space 300 selected by the player. The disposing step may also include disposing of an object within a random area of the playing space 300 or within a random area in a subset of the playing space selected by the gaming control system 200. Thus, in the illustrated example, the disposing step would include disposing a building 310 within the city 305. As noted above, the triggering event may include essentially any event within the basic wagering game (i.e., at the gaming terminal) or within the group game itself. For example, the triggering event could include, in the group game, a pre-determined minimum valuation of objects in the playing space 300 or could include, in the basic wagering game, a combination of or sequence of indicia on a gaming terminal 100, or a combination of such events.

The realization event comprises the arrival of an entity to a portion of the playing space 300 and which bestows upon players having objects disposed within the portion of the playing space a benefit, such as the above noted award. Other themes may omit the entity and instead provide, for example, a natural occurrence such as an earthquake, tornado, volcanic eruption, meteor-strike or the like or other influence (e.g., mob, riot, etc.) Still other aspects of game play may advantageously include non-violent, family-related themes to cater to various other interests. In the example of FIGS. 3-8, the realization event includes the arrival of CASHZILLA 350, which bestows a benefit upon players having objects disposed within the portion of the playing space trampled by or otherwise influenced by CASHZILLA by other violent or non-violent means (e.g., coloring buildings gold). Players having objects disposed adjacent the portion of the playing space so influenced by CASHZILLA 350 may also be provided with an award.

One aspect of the present concepts is a method of conducting a wagering game at a plurality of gaming terminals connected to a controller 210, including receiving wager inputs at one or more gaming terminals and assigning at least a portion of a value of a wager and/or an award in a wagering game to an object in an ancillary game. The method also includes the step of randomly assigning a location to the object within a gaming space and correlating the object to a respective gaming terminal or player at the gaming terminal. In further aspects thereof, the correlating step may include correlating the size and/or appearance of an object to generally correspond to a value of the object or to correspond to the individual players, such as by color-coding, shading, or cross-hatching of the objects. Any visually distinctive device may be used to differentiate the objects from one another.

In another exemplary method in accord with the present concepts, a method of operating a gaming terminal includes receiving a wager from a player, conducting a game on the gaming terminal, using at least one input by the player to determine an outcome of the game, displaying an outcome of the game on the gaming terminal, and assigning at least a portion of a value of at least one of an award and the wager to an object in a persistent state group game. Further steps may include displaying an outcome of the assigning step in the group game on a gaming terminal and displaying an outcome of the assigning step in the group game on an area display.

A wagering game system thus may include a controller 210 for conducting a group game for a group of players under the control of a gaming control system 200 and an associated plurality of gaming terminals (e.g., 210-*n* in FIG. 2(*a*)), each gaming terminal being connected to the controller and being configured to conduct a group game in combination with the controller, wherein the gaming control system is configured to contribute at least a portion of an award to each player satisfying a winning event at a gaming terminal and/or a wager input at a gaming terminal to build an object in a group game. In one aspect of the wagering game system, after a threshold plurality of objects have been built or collected in the group game, a triggering event is enabled on at least one of the gaming terminals. For example, after the city 305 is at least 50% complete, one of the gaming terminals (e.g., 210), a plurality of gaming terminals (e.g., 210, 220), or each of the gaming terminals (e.g., 210-*n*) may be enabled to trigger or produce a realization event upon the occurrence of a designated symbol or sequence of symbols in the wagering game.

Once the triggering event triggers a realization event, players who contributing to the building of objects in the persistent state group game may be eligible to receive a reward. The players selected to receive the award may be selected based on any criteria. In the example of FIGS. 3-8, the realization event is represented graphically by the appearance of CASHZILLA 350 and the selection of players to receive an award is depicted by the movement of CASHZILLA through the city 305 and selective destruction of, or non-violent equivalent of (e.g., coloring buildings gold), buildings 310, structures, and objects along a path determined by the gaming control system 200, which may be integrated with one or more selected gaming terminals 100. The determination of the path of CASHZILLA 350 may be completely random, as determined by the gaming control system 200. Moreover, selection by a path across the city 305 is only one of any number of suitable vehicles for designating winning players. The realization event does not require a path, per se, and could alternatively comprise selection, randomly or otherwise, of a portion of the group game gaming space 300, such as a certain block, district or neighborhood of a city 305, to receive the benefit or award in the manner noted above.

If a player decides to leave a group game in progress before the occurrence of a realization event, the player will typically be requested to log out of the gaming terminal, at which time one or more options may be presented to the player to recover any assets that might be held in the group game gaming space 300.

In a persistent state game, for example, the player may simply store his or her accumulated assets within a suitable storage medium or otherwise associate his or her accumulated assets to a personal player's club identification number for application in a subsequent game by the player. Alternatively, the location and/or characteristics of actual objects collected by the player may be preserved in-state for subsequent application by the player in a subsequent play of the group game. In another aspect, the outcome of the realization event may even be credited to a personal player's club identification number without requirement for such player to be playing on a gaming terminal at the time of a realization event.

In another aspect, the gaming control system 200 may simply be configured to keep the objects collected by the player and distribute these objects to the group or assign them to the house. In other words, the players collected objects are assimilated back into the group-game in some manner. This distribution could include, for example, an even distribution to remaining players, a weighted distribution tied to the value of the objects held by the remaining players, an even distribution to the beneficiaries of a next realization event, or a weighted distribution tied to the value of the objects held by the beneficiaries of a next realization event.

In still another aspect, the gaming control system 200 may provide the player with a pre-determined percentage of the value of the player's objects held in the group game. This percentage could be set to any value (e.g., 100%, 95%, 90%, 85%, or 80% of the value of the player's objects held in the group game). Alternatively, the player could be permitted to play a bonus game, or the like, to determine the percentage of the value that the player would get back. Such bonus game, or the like, could optionally include amounts in excess of the sum of the player's objects held in the group game (e.g., 105%, 110% or more) to increase excitement. Once the gaming control system 200 has determined the disposition of the player's assets, any remainder may optionally be distributed to other players, such as noted above.

In still another option, the other players may be permitted to negotiate and make deals amongst themselves to purchase other players buildings 310, structures, properties or objects. Such deal-making would be particularly attractive if the gaming control system 200 offered a less than optimal payment for the sum of a player's objects held in the group game. For example, if the gaming control system 200 would only award 80% or 75% of the sum of the player's objects held in the group game, then it may be advantageous for the player to solicit bids from other players. For the player purchasing the other player's assets in the game, for some amount higher that which would be provided by the gaming control system 200 (e.g., 80%), both players benefit more than each would have if the player had accepted the buy-out from the gaming control system. To facilitate such player interaction for the above reason, or for any other reason, the group game may utilize communication means inclusive of text messaging or emails, outlined in co-pending U.S. patent application Ser. No. 10/369,021 (titled "Communication Between Players At Gaming Terminals") filed Feb. 19, 2003, which is incorporated herein by reference.

The gaming control system 200 may itself determine that a player has terminated game play by indicia such as, but not limited to, certain pre-determined minimum periods of inactivity or by the use a sensor to sense if the player has left the gaming terminal (e.g., pressure switch in a seat, opening or closing or a light-based switch, failure to detect motion in the gaming terminal, etc.). Unless a player has made prior arrangements to apply the value of the player's objects in the group game gaming space 300 to a particular account, such as that relating to the personal player's club identification number, the gaming control system may assimilate the value of the player's objects in the group game gaming space into the non-public or house domain.

Group members may also place side wagers on other team players. The use of and implementation of side wagering in a group game is provided in co-pending U.S. patent application Ser. No. 10/612,478 titled "Gaming Machine Having A Community Game With Side Wagering" filed Jul. 2, 2003, incorporated herein by reference in its entirety.

In accord with the present concepts, there is provided, in one aspect, a gaming terminal 100, including a controller 210 for connecting the gaming terminal to a network 212 or service in which a group game is conducted and at least one display for displaying a wagering game conducted at the gaming terminal, wherein, in response to any one of a plurality of predetermined events at a gaming terminal, at least a portion of a value of an award or a wager input at the gaming terminal is applied to another game to build an object therein.

In alternative embodiments, a player can use a telephone to access and use one or more of the player's accumulated game assets. For example, using a mobile phone, the player can dial a toll-free phone number to access his or her game assets. In such embodiments, a central server associated with the network 212 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 100.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 100 while the player is physically at the gaming machine. Before the player walks away from the gaming machine 100, the player can register the gaming machine to the player's phone. The player can also let the gaming machine 100 know what assets it may intend to use in the future via remote access by the phone. For example, the player can register the phone number as a password required to access the player's assets on the gaming machine. The player can initiate an auto-play feature while at the gaming machine 100 or remotely via the phone. The auto-play feature of the gaming machine 100 is configured to report, e.g., via still or moving images on the phone, one or more of the gaming outcomes. Then, at a later time, the player returns to the gaming machine 100, re-checks into the gaming machine via the phone and, optionally, cashes out any winnings. While no actual gameplay occurs on the phone, the phone is used for accessing the player's assets and gaming outcomes on the gaming machine 100.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 100 or a larger award if the player uses the telephone. In another example, the player may be given the option to play for smaller awards while the player is physically present at the gaming machine 100 or for larger awards if the player uses the telephone for gameplay initiation.

Alternative to using a voice telephone call to initiate a game or to access assets and/or awards, as described above, the player can send a text message. For example, the player can send a special code in the text message to log-in using a special number on the gaming machine 100.

For identification purposes, various verification ways can be used. For example, the player can enter the mobile telephone number into the gaming machine 100 as a player identification number. When the phone is near, the gaming machine 100 can detect it and verify the player identification number, e.g., the mobile number. For example, a receiver can be installed in the gaming machine 100 for detecting a mobile identifier (which may include the mobile number) that is periodically transmitted by mobile phones to the nearest mobile base station. Thus, the gaming machine 100 would have similar capabilities to the mobile base station.

Alternatively, the gaming machine 100 can send a voice or text message to the mobile telephone to verify the player's identification number. For example, the gaming machine 100 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y. Optionally, the special benefits can be made available based on the telephone model.

While the present invention has been described with reference to one or more particular embodiments, those skilled in the art will recognize that many changes may be made thereto without departing from the spirit and scope of the present concepts, which generally includes but is not limited to the collection of assets by players during regular game play, the assets so collected becoming part of a shared ancillary game, in which some player's assets are turned into awards and some assets are optionally left for later play of the ancillary game. In another aspect, the group game gaming space may comprise a set of spinning reels and, upon occurrence of a winning condition at a gaming terminal, players receive individual reel stops. The realization event could comprise a free group spin, or the like. When the free group spin is initiated, the symbol appearing in any given player's reel stop results in an award to the player in an amount corresponding to the symbol. Each of these embodiments and obvious variations thereof is contemplated as falling within the spirit and scope of the claimed invention, which is set forth in the following claims.

What is claimed is:

1. A wagering game system, comprising:

a gaming control system configured to conduct a group game for a plurality of gaming terminals and to assign at least one object to the group game following the occurrence of a winning combination or event on a gaming terminal in association with a player at the gaming terminal, wherein, upon satisfaction of a predetermined triggering event on at least one of the plurality of gaming terminals or within the group game, a realization event occurs and provides an award for each object in a randomly selected group of objects, the randomly selected group of objects comprising objects associated with a plurality of players, in the group game at a time of said predetermined realization event, and wherein said predetermined realization event is influenced by said group of objects.

2. The wagering game system of claim 1, further comprising at least one controller for facilitating communication between each of the gaming terminals and the gaming control system.

3. The wagering game system of claim 1, wherein the group of objects comprises a building, buildings, a portion of a building, a structure, or a collection of structures, or any combination thereof.

4. The wagering game system of claim 1, wherein the objects are related to one another.

5. The wagering game system of claim 1, wherein the group of objects comprises portions of a larger entity, said larger entity comprising a village, town, city, region, state, country, district, province, or land-mass, or any combination thereof.

6. The wagering game system of claim 1, wherein said predetermined triggering event comprises the occurrence of a predetermined event or combination of events on at least one gaming terminal.

7. The wagering game system of claim 1, wherein said predetermined triggering event comprises the occurrence of a predetermined event or combination of events in the group game.

8. A wagering game system, comprising:

a gaming control system configured to conduct a group game for a plurality of gaming terminals and to assign at least one object to the group game following the occurrence of a winning combination or event on a gaming terminal in association with a player at the gaming terminal, wherein, upon satisfaction of a predetermined triggering event on at least one of the plurality of gaming terminals or within the group game, a realization event occurs and provides an award for each object in a randomly selected group of objects, the randomly selected group of objects comprising objects associated with a plurality of players, in the group game at a time of said predetermined realization event, and wherein said predetermined realization event is influenced by an object in said group of objects.

9. The wagering game system of claim 8, further comprising at least one controller for facilitating communication between each of the gaming terminals and the gaming control system.

10. The wagering game system of claim 8, wherein the group of objects comprises a building, buildings, a portion of a building, a structure, or a collection of structures, or any combination thereof.

11. The wagering game system of claim 8, wherein the objects are related to one another.

12. The wagering game system of claim 8, wherein the group of objects comprises portions of a larger entity, said larger entity comprising a village, town, city, region, state, country, district, province, or land-mass, or any combination thereof.

13. The wagering game system of claim 8, wherein said predetermined triggering event comprises the occurrence of a predetermined event or combination of events on at least one gaming terminal.

14. The wagering game system of claim 8, wherein said predetermined triggering event comprises the occurrence of a predetermined event or combination of events in the group game.

15. A wagering game system, comprising:

a gaming control system configured to conduct a group game for a plurality of gaming terminals and to assign at least one object to the group game following the occurrence of a winning combination or event on a gaming terminal in association with a player at the gaming terminal, wherein, upon satisfaction of a predetermined triggering event on at least one of the plurality of gaming terminals or within the group game, a realization event occurs and provides an award for each object in a randomly selected group of objects, the randomly selected group of objects comprising objects associated with a plurality of players, in the group game at a time of said predetermined realization event, and wherein said award is awarded to randomly selected players having objects within the group game.

16. The wagering game system of claim 15, further comprising at least one controller for facilitating communication between each of the gaming terminals and the gaming control system.

17. The wagering game system of claim 15, wherein the group of objects comprises a building, buildings, a portion of a building, a structure, or a collection of structures, or any combination thereof.

18. The wagering game system of claim 15, wherein the objects are related to one another.

19. A method of conducting a group game comprising a plurality of players and involving a plurality of gaming terminals, comprising the steps of:

communicatively coupling a plurality of gaming terminals to a controller configured to execute instructions for the group game;

permitting a player at each gaming terminal of the plurality of gaming terminals to collect one or more objects in the group game;

displaying objects collected by each player on a display associated with the group game;

initiating a realization event affecting a randomly determined plurality of the displayed objects in response to a triggering event; and awarding an award to each of a plurality of players associated with the respective randomly determined plurality of displayed objects affected by the realization event;

wherein said triggering event comprises a predetermined minimum valuation of objects in said playing space.

* * * * *